United States Patent
Zhang

(10) Patent No.: US 10,634,312 B2
(45) Date of Patent: Apr. 28, 2020

(54) LARGE-ANGLE LED WORKING LAMP

(71) Applicant: FoShan Brighter LED Lighting Co., Ltd., Foshan (CN)

(72) Inventor: Xiangcheng Zhang, Pingjiang (CN)

(*) Notice: Subject to any disclaimer, the term of this patent is extended or adjusted under 35 U.S.C. 154(b) by 0 days.

(21) Appl. No.: 16/287,210

(22) Filed: Feb. 27, 2019

(65) Prior Publication Data
US 2020/0096173 A1  Mar. 26, 2020

(51) Int. Cl.
| | | |
|---|---|---|
| *F21V 5/04* | (2006.01) |
| *F21K 9/237* | (2016.01) |
| *F21V 1/12* | (2006.01) |
| *F21K 9/66* | (2016.01) |
| *F21V 29/74* | (2015.01) |
| *F21S 41/147* | (2018.01) |
| *F21S 41/20* | (2018.01) |
| *F21S 41/19* | (2018.01) |
| *F21K 9/238* | (2016.01) |
| *F21Y 115/10* | (2016.01) |

(52) U.S. Cl.
CPC .............. *F21V 5/048* (2013.01); *F21K 9/237* (2016.08); *F21K 9/238* (2016.08); *F21K 9/66* (2016.08); *F21S 41/147* (2018.01); *F21S 41/192* (2018.01); *F21S 41/285* (2018.01); *F21V 1/12* (2013.01); *F21V 29/745* (2015.01); *F21Y 2115/10* (2016.08)

(58) Field of Classification Search
CPC .......... F21V 5/048; F21V 29/745; F21V 1/12; F21K 9/237; F21K 9/66; F21K 9/238; F21S 41/285; F21S 41/192; F21S 41/147; F21Y 2115/10
See application file for complete search history.

(56) References Cited

U.S. PATENT DOCUMENTS

| | | | | |
|---|---|---|---|---|
| 2009/0073681 A1* | 3/2009 | Chen | ........................ | F21S 8/086 362/218 |
| 2009/0323343 A1* | 12/2009 | Wang | ....................... | F21S 8/086 362/249.11 |
| 2010/0321930 A1* | 12/2010 | Watanabe | ............... | F21S 8/086 362/184 |
| 2011/0110082 A1* | 5/2011 | Jong | ........................ | F21S 8/086 362/235 |
| 2018/0332204 A1* | 11/2018 | Chien | .................... | H04N 7/186 |
| 2019/0059142 A1* | 2/2019 | Chen | ........................ | F21V 5/045 |

* cited by examiner

*Primary Examiner* — Joseph L Williams
*Assistant Examiner* — Jose M Diaz
(74) *Attorney, Agent, or Firm* — HYIP

(57) ABSTRACT

A large-angle LED working lamp comprising a shell, a lampshade clamped with the shell, light-emitting units arranged in the shell and a connector electrically connected with a power generation unit; the light-emitting unit comprises a circuit board and a convex lens; a light-emitting diode is arranged on the circuit board, and the convex lens covers the light-emitting diode; the number of the light-emitting units is three, comprising a central light-emitting unit and two side light-emitting units that are symmetrically arranged on the two sides of the central light-emitting unit; the angle formed between each side light-emitting unit and the central light-emitting unit is 20-30 degrees; through the central light-emitting unit and the two side light-emitting units that are symmetrically arranged on the two sides of the central light-emitting unit, the light-emitting angles in three different directions can be formed so that the illuminating angle can reach 90-120 degrees.

10 Claims, 4 Drawing Sheets

LARGE-ANGLE LED WORKING LAMP

TECHNICAL FIELD OF THE INVENTION

The present invention relates to the field of lighting, and more particularly, to a large-angle LED (light-emitting diode) working lamp.

BACKGROUND OF THE INVENTION

The lighting system of a motor vehicle consists of working lamps mounted and integrated to the front, rear, sides, and in some cases the top of a motor vehicle. These working lamps mainly comprise headlamps and tail-lamps for serving purposes including lighting and signaling. For instance, the headlamps light the roadway for the driver, allowing the driver to drive safely at night.

In the prior art, traditional agricultural machinery vehicles and engineering vehicles are usually equipped with a plurality of working lamps during operation for wholly covering the periphery of the vehicles. However, for the light-emitting angle of traditional LED working lamps is small, normally 60 degrees, and the emission of light is unidirectional, a larger light-emitting angle undoubtedly leads to a poorer light intensity. As a result, an agricultural or engineering vehicle needs to be equipped with a plurality of working lamps, and each of them is used for lighting a specific area during operation.

SUMMARY OF THE INVENTION

The purpose of the present invention is to solve the shortcomings in the prior art by providing a large-angle LED working lamp.

To achieve the above purpose, the present invention adopts the following technical solution:

A large-angle LED working lamp comprising a shell, a lampshade clamped with the shell, light-emitting units arranged in the shell, and a connector electrically connected with a power generation unit; the light-emitting unit further comprises a circuit board and a convex lens; a light-emitting diode is arranged on the circuit board, and the convex lens covers the light-emitting diode; the number of the light-emitting units is three, comprising a central light-emitting unit and two side light-emitting units that are symmetrically arranged on the two sides of the central light-emitting unit; the angle formed between each side light-emitting unit and the central light-emitting unit is 20-30 degrees.

In another aspect of the present invention, the number of the light-emitting diodes arranged on the circuit board is two.

In another aspect of the present invention, the shell is made of aluminum alloy.

In another aspect of the present invention, a plurality of heat dissipation fins are integrally formed on the shell.

In another aspect of the present invention, the lampshade is made of a PC material.

In another aspect of the present invention, a vent valve is arranged on the shell.

An automobile headlamp, comprising an LED working lamp and a mounting frame used for being connected with the automobile, wherein the mounting frame is connected to the bottom of the shell in a bolting mode.

Compared with the prior art, the present invention has the following advantages:

Through the central light-emitting unit and the two side light-emitting units that are symmetrically arranged on the two sides of the central light-emitting unit, during operation, the light-emitting direction of the central lens faces right ahead, and the light-emitting directions of the two side lenses and the central lens respectively form an angle of 40-60 degrees. Therefore, the light-emitting angles in three different directions can be formed so that the illuminating angle can reach 90-120 degrees, greatly reducing the number of working lamps, and achieving a uniform light intensity and a high utilization rate.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

1 Shell, 11 Heat Dissipation Fins, 2 Lampshade, 3 Connector, 4 Mounting Frame, 5 Central Light-emitting Unit, 6 Side Light-emitting Unit, 7 Circuit Board, 71 Light-emitting Diode, 8 Convex Lens, 9 Vent Valve

DETAILED DESCRIPTION OF THE INVENTION

Drawings and detailed embodiments are combined hereinafter to elaborate the technical principles of the present invention.

Embodiment 1

Figure 1:
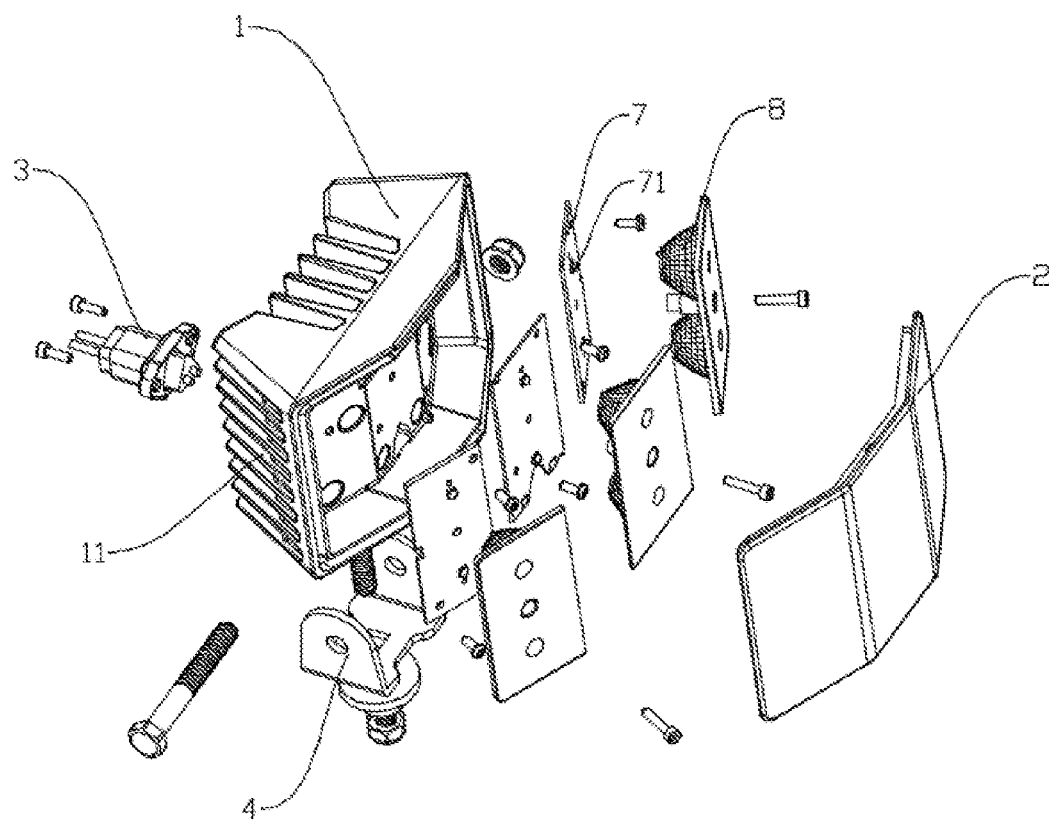
FIG. 1 is an explosive view of the large-angle LED working lamp of the present invention.
Figure 2:
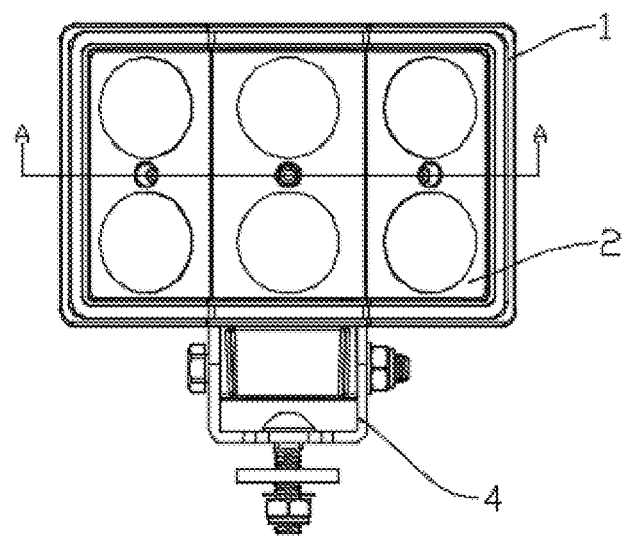
FIG. 2 is a schematic diagram illustrating the plane structure of the large-angle LED working lamp of the present invention.
Figure 3:
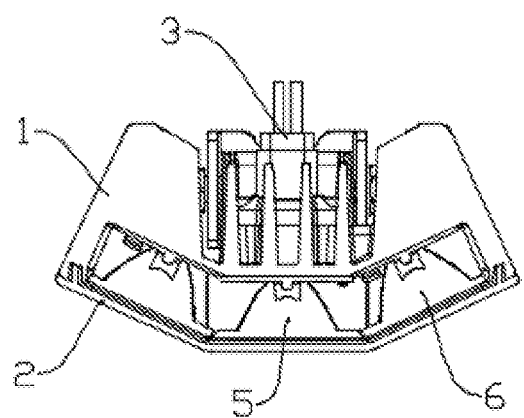
FIG. 3 is a sectional view taken along line A-A in FIG. 2.
Figure 4:
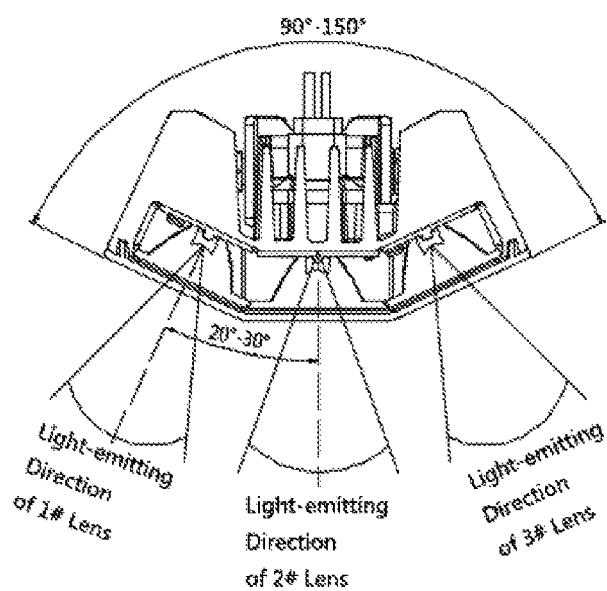
FIG. 4 is a schematic diagram illustrating the operating principle of the large-angle LED working lamp of the present invention.
Figure 5:
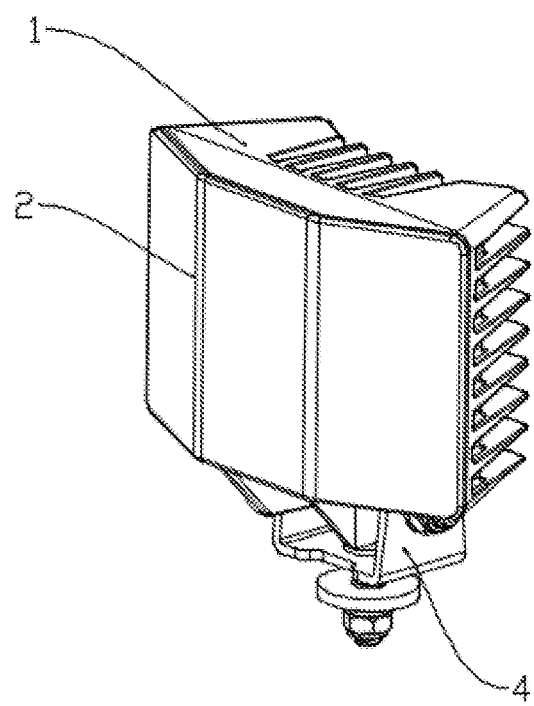
FIG. 5 is a perspective view showing the structure of the large-angle LED working lamp of the present invention.
Figure 6:
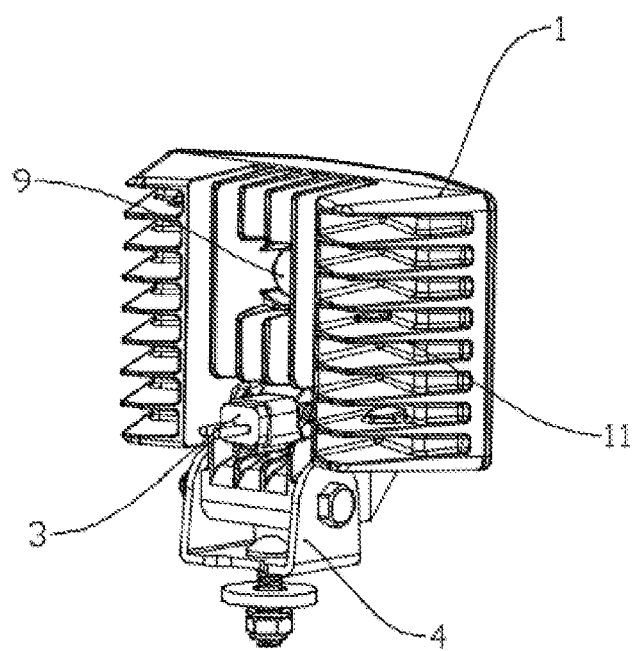
FIG. 6 is another perspective view showing the structure of the large-angle LED working lamp of the present invention.

As shown in FIGS. 1-6, in this embodiment, the large-angle LED working lamp of the present invention comprises a shell 1, a lampshade 2 clamped with the shell 1, light-emitting units arranged in the shell 1 and a connector 3 electrically connected with a power generation unit. The light emitting unit comprises a circuit board 7 and a convex lens 8. A light-emitting diode 71 is arranged on the circuit board 7, and the convex lens 8 covers the light-emitting diode 71.

Compared with the prior art, three light-emitting units are arranged in the LED working lamp of the present invention, comprising a central light-emitting unit 5 and two side light-emitting units 6 that are symmetrically arranged on the two sides of the central light-emitting unit 5. The angle formed between each side light-emitting unit 6 and the central light-emitting unit 5 is 20-30 degrees. During operation, the light-emitting direction of the central lens faces right ahead, and the light-emitting directions of the two side lenses and the central lens respectively form an angle of 40-60 degrees. Therefore, the light-emitting angles in three different directions can be formed so that the illuminating angle can reach 90-120 degrees, greatly reducing the number of working lamps, and achieving a uniform light intensity and a high utilization rate.

Further, two light-emitting diodes 71 are arranged on the circuit board 7 so that the light intensity can be effectively improved. Two lenses 8 are arranged to correspond to the two light-emitting diodes 71.

To ensure the heat dissipation effect, in this embodiment, the shell 1 is made of aluminum alloy, and a plurality of heat dissipation fins 11 are integrally formed on the shell 1 for further enhancing the heat dissipation efficiency.

Further, the lampshade 2 is made of a PC material with an ideal light transmission. A vent valve 9 is arranged on the shell 1, achieving good air circulation in the shell 1.

Embodiment 2

This embodiment provides an automobile headlamp, which comprises an LED working lamp and a mounting frame 4 used for being connected with the automobile, wherein the mounting frame 4 is connected to the bottom of the shell 1 in a bolting mode.

The operating principle of the present invention is the following:

Through the central light-emitting unit 5 and the two side light-emitting units 6 that are symmetrically arranged on the two sides of the central light-emitting unit 5, during operation, the light-emitting direction of the central lens faces right ahead, and the light-emitting directions of the two side lenses and the central lens respectively form an angle of 40-60 degrees. Therefore, the light-emitting angles in three different directions can be formed so that the illuminating angle can reach 90-120 degrees, greatly reducing the number of working lamps, and achieving a uniform light intensity and a high utilization rate.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A large-angle LED working lamp, comprising:
a shell,
a lampshade clamped with the shell,
light-emitting units arranged in the shell, and
a connector electrically connected with a power generation unit, wherein each light-emitting unit further comprises a circuit board and a convex lens, wherein a light-emitting diode is arranged on the circuit board, and the convex lens covers the light-emitting diode, wherein the number of the light-emitting units is three, comprising a central light-emitting unit and two side light-emitting units that are symmetrically arranged on the two sides of the central light-emitting unit, wherein the angle formed between each side light-emitting unit and the central light-emitting unit is 20-30 degrees.

2. The large-angle LED working lamp of claim 1, wherein the number of the light-emitting diodes arranged on the circuit board is two.

3. The large-angle LED working lamp of claim 2, wherein the shell is made of aluminum alloy.

4. The large-angle LED working lamp of claim 3, wherein a plurality of heat dissipation fins are integrally formed on the shell.

5. The large-angle LED working lamp of claim 1, wherein the lampshade is made of a PC material.

6. The large-angle LED working lamp of claim 5, wherein a vent valve is arranged on the shell.

7. An automobile headlamp, comprising:
a large-angle LED working lamp, comprising:
a shell,
a lampshade clamped with the shell,
light-emitting units arranged in the shell, and
a connector electrically connected with a power generation unit, wherein each light-emitting unit further comprises a circuit board and a convex lens, wherein a light-emitting diode is arranged on the circuit board, and the convex lens covers the light-emitting diode, wherein the number of the light-emitting units is three, comprising a central light-emitting unit and two side light-emitting units that are symmetrically arranged on the two sides of the central light-emitting unit, wherein the angle formed between each side light-emitting unit and the central light-emitting unit is 20-30 degrees, wherein the number of the light-emitting diodes arranged on the circuit board is two, wherein the shell is made of aluminum alloy, wherein a plurality of heat dissipation fins are integrally formed on the shell, wherein the lampshade is made of a PC material, wherein a vent valve is arranged on the shell.

8. The large-angle LED working lamp of claim 2, wherein the lampshade is made of a PC material.

9. The large-angle LED working lamp of claim 3, wherein the lampshade is made of a PC material.

10. The large-angle LED working lamp of claim 4, wherein the lampshade is made of a PC material.

* * * * *